Aug. 8, 1961     F. F. HEISER ET AL     2,995,145

GAS PRESSURE REGULATOR

Filed April 15, 1959

INVENTOR.
FERDINAND F. HEISER
BY RICHARD E. HORA

ATTORNEY

United States Patent Office 2,995,145
Patented Aug. 8, 1961

2,995,145
GAS PRESSURE REGULATOR
Ferdinand F. Heiser and Richard E. Hora, Milwaukee, Wis., assignors to Controls Company of America, Schiller Park, Ill., a corporation of Delaware
Filed Apr. 15, 1959, Ser. No. 806,709
4 Claims. (Cl. 137—454.2)

This invention relates to a gas pressure regulator, and particularly to a valve reduced in size for the same capacity flow and that can be easily serviced.

The usual pressure regulator valve required a spring having a characteristically low spring rate which dictated a long spring opposing the movements of the diaphragm. Usually a compression spring was employed which was housed on the top of the valve requiring a relatively large housing. This housing was objectionable since it increased the size of the valve and limited its application to areas where it could be easily adapted. In order to satisfy installation requirements, reduced size regulators are required and that is the primary object of the invention.

The present invention proposes to achieve this objective by placing a tension spring within the casing to control the response of the diaphragm. This arrangement provides a particular advantage over previous regulator valves in that the valve is readily accessible for servicing, and this can be accomplished without disturbing the spring setting.

Other objects and advantages will be pointed out in, or be apparent from, the specification and claims, as will obvious modifications of the single embodiment shown in the drawings, in which:

Figure 1:
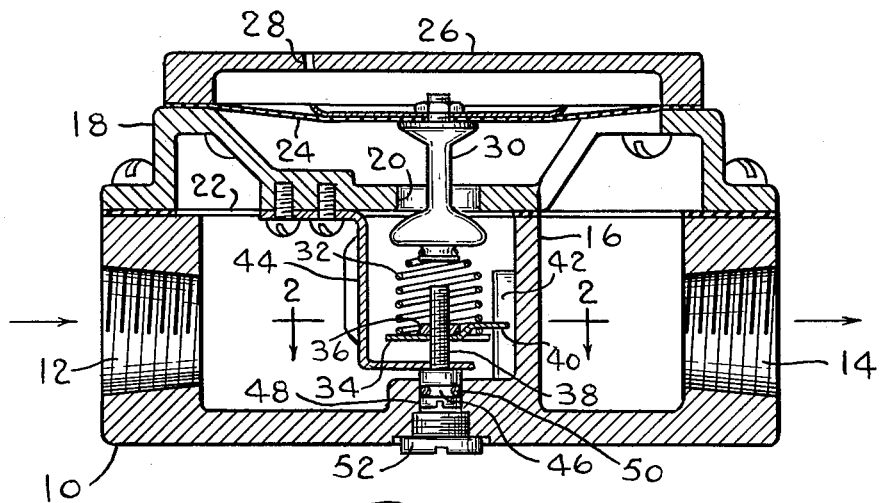
FIGURE 1 is a front elevation of the valve, partly in section, showing the present invention.

In the drawing, casing 10 is shown with an inlet 12, an outlet 14 and a partition 16 separating the inlet from the outlet. A valve seat casting 18 having an orifice 20 is seated on top of the casing 10 and is sealed thereto by a gasket 22. Diaphragm 24 is clamped to the casting downstream from the orifice by cover 26 which has a vent 28. Flow through the orifice is controlled by valve 30 which is attached to the diaphragm. Response pressure of the diaphragm is adjusted by a tension spring 32 connected to the valve in opposition to the outlet pressure acting on the underside of the diaphragm. To prevent lateral forces from being introduced to the valve the end of the spring attached to the valve has a conical winding thereon. The tension in the spring is adjusted by a plate 34 attached to the spring and secured to a nut 36 threaded onto screw 38. The plate is prevented from rotating by a finger 40 that slides up and down in a channel 42 on partition 16. The adjusting screw 38 is restrained by a bracket 44 mounted on the casting. The head 46 of the screw extends into an orifice 48 in the casing and is sealed therein by O ring 50. Adjustment of the screw from outside of the casing can be accomplished by removing cap 52 and turning the screw head.

When the valve in FIGURE 1 is serviced, casting 18 is removed, carrying the bracket 44, adjusting screw 38 and spring 32 with it. Thus complete servicing can be accomplished without readjusting the setting upon replacing the casting on the casing.

Figure 3:
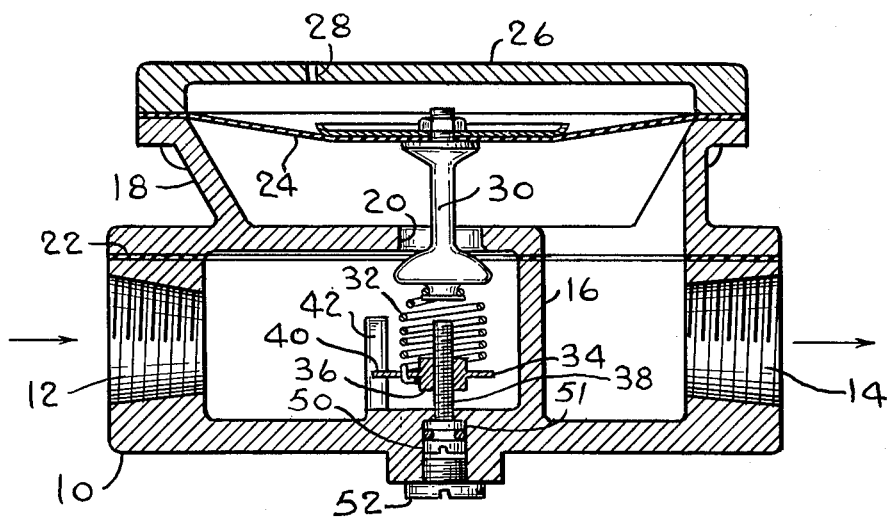
FIGURE 3 is an elevation of a modified form of a gas pressure regulator valve.
Figure 2:
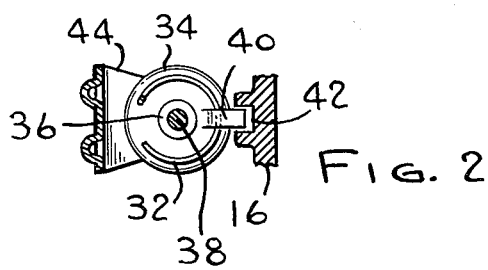
FIGURE 2 is taken on lines 2—2 of FIGURE 1.

In the simplified form shown in FIGURE 3, the bracket 44 has been eliminated and the screw projects through an orifice 50 in the wall of the casing and is restrained there by the head 51. Spring plate 34 is secured to nut 36 threaded on the screw is held from rotation by a finger 40 which slidably engages a channel 42 within the casing. Rotation of the screw moves the spring plate up or down to increase or decrease the tension on the spring. In servicing this valve the adjusting screw must be removed from the plate prior to the casting being removed from the top of the casing.

Although but two embodiments of the present invention have been illustrated and described, it will be apparent to those skilled in the art that various changes and modifications may be made therein without departing from the spirit of the invention or from the scope of the appended claims.

We claim:

1. A pressure regulating valve comprising a casing having a flow path between an inlet and an outlet, a cover secured to the casing and including an orifice in the flow path between the inlet and the outlet, a valve controlling flow through the orifice, a diaphragm mounted within the cover on the outlet side of the orifice and connected to the valve, means secured to the cover biasing the valve against the force of the outlet pressure on the diaphragm including a spring on the inlet side of the orifice, means for adjusting the tension on the spring from the outside of the casing, said diaphragm, valve, spring and adjusting means being removable from the casing as a unit with the cover.

2. A pressure regulator comprising a casing having an inlet, an outlet, and a partition between the inlet and the outlet, a casting sealed on the casing and having a flow orifice between the inlet and the outlet, a valve cooperating with the orifice to vary the size of the orifice, a diaphragm connected to the valve and clamped to the casting so that it is responsive to outlet pressure, a tension spring connected to the valve to control the response pressure of the diaphragm, an adjusting screw extending into an aperture in the casing for adjustment from the exterior of the casing and being connected to the spring through a nut and a spring plate, said screw being restrained by a bracket mounted on the casting, means on the casing for restraining said plate from rotation said bracket maintaining the adjustment of the diaphragm, valve, screw and spring when the casting is removed from the casing.

3. A pressure regulator comprising a casing having an inlet, an outlet, and a partition between the inlet and the outlet, a casting sealed on the casing and having a flow orifice between the inlet and the outlet, a valve cooperating with the orifice to vary the size of the orifice, a diaphragm connected to the valve and clamped to the casting so that it is responsive to outlet pressure, a tension spring connected to the valve, an adjusting screw extending through the casing and connecting the spring to the casting through a nut and a spring plate to control the response pressure of the diaphragm, said spring plate translating the rotative motion of the screw into linear motion of the spring to vary the tension of the spring said diaphragm, valve, adjusting screw, nut and spring plate being removable as an integral part of the casting.

4. A pressure regulator comprising a casing having an inlet, an outlet, a partition between the inlet and the outlet, a casting sealed on the casing and having a flow orifice between the inlet and the outlet, a valve cooperating with the orifice to vary the size of the orifice, a diaphragm connected to the valve and clamped to the casting so that it is responsive to outlet pressure, a coiled tension spring connected to the valve to control the response pressure of the diaphragm, said spring being connected to the valve by a conical winding to prevent the introduction of lateral forces to the valve, an adjusting screw mounted on the casting and extending through the casing and having a spring plate to vary the bias of the spring, said plate translating the rotative motion of the screw into linear motion of the spring to vary the response of the diaphragm.

References Cited in the file of this patent

UNITED STATES PATENTS

| | | |
|---|---|---|
| 661,283 | Benedict | Nov. 6, 1900 |
| 774,340 | Smith | Nov. 8, 1904 |
| 1,057,288 | Short | Mar. 25, 1913 |
| 1,231,293 | Peters | June 26, 1917 |
| 2,735,669 | Seiler | Feb. 21, 1956 |
| 2,899,972 | Matthews | Aug. 18, 1959 |